Patented June 13, 1933

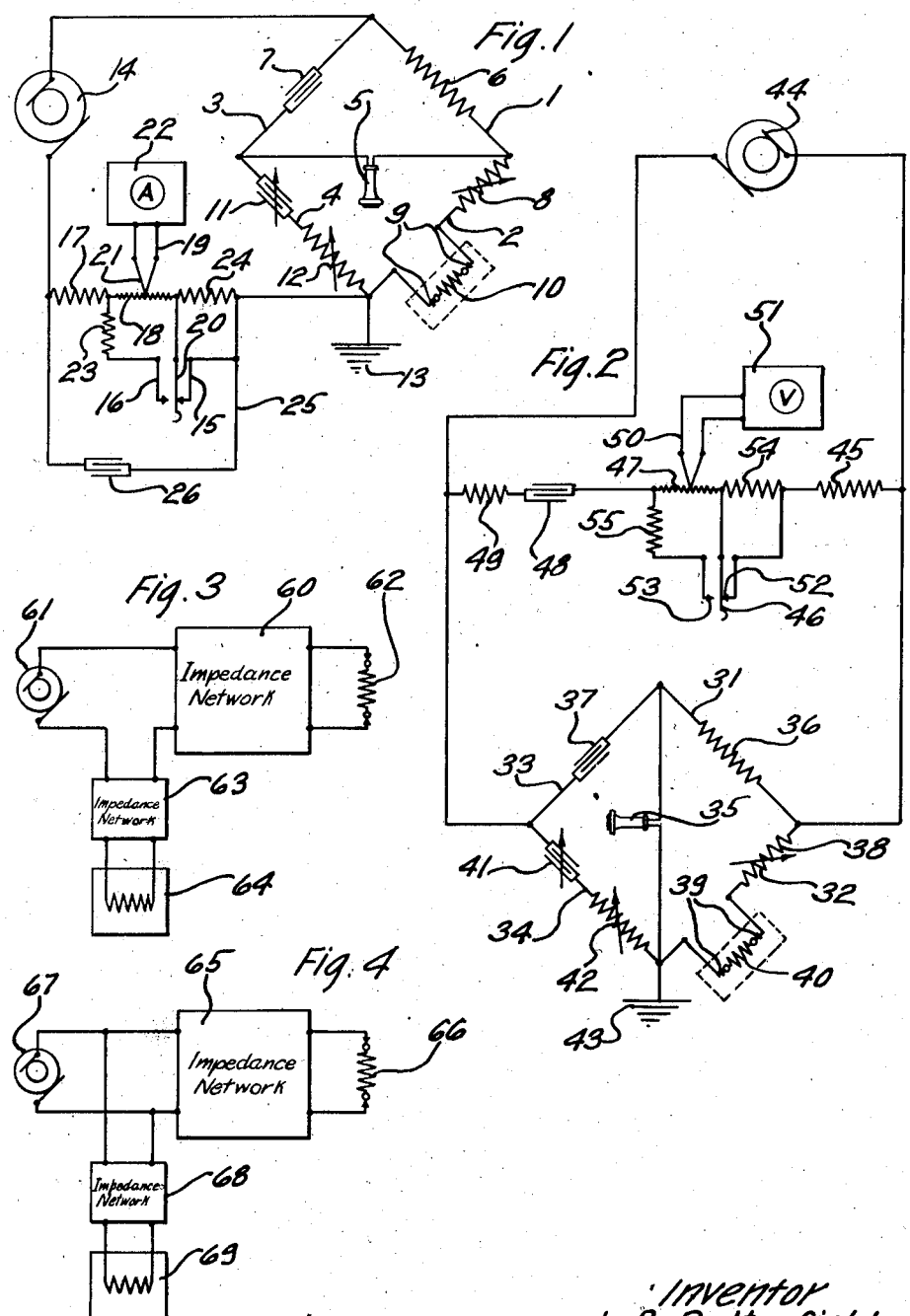

1,914,108

UNITED STATES PATENT OFFICE

LOUIS B. BUTTERFIELD, OF HILLSIDE, NEW JERSEY, ASSIGNOR TO WESTERN ELECTRIC COMPANY, INCORPORATED, OF NEW YORK, N. Y., A CORPORATION OF NEW YORK

METHOD OF AND APPARATUS FOR MEASURING ELECTRICAL QUANTITIES

Application filed March 12, 1931. Serial No. 521,963.

This invention relates to a method of and apparatus for measuring electrical quantities, and more particularly to a method of and apparatus for measuring the current through and the potential across a branch of an electrical network.

An object of this invention is to provide a simple and efficient method of and apparatus for measuring the current through and the potential across a component branch or element of an electrical circuit network.

In accordance with this object, one embodiment of the invention comprises a method and apparatus for measuring the current through and the potential across any component branch or element of an electrical circuit network in or to which element or branch circuit a potential indicating or measuring device cannot be directly connected for electrical reasons such as the disturbing effect produced by the impedance of the indicating or measuring device on the current through a potential across the element or branch or on the impedance of the element or branch. In the preferred embodiment a main electrical network is provided with a component arm, and an auxiliary electrical network having characteristics similar to the main network is connected in the supply circuit for the main network. The auxiliary network includes a measuring instrument which, when the apparatus is in operation, indicates the electrical characteristics of the current flowing through or the potential across the component branch of the main network.

The invention is particularly applicable to electrical testing apparatus such as apparatus for testing the effective inductance and effective resistance of transformers, inductance coils and other coil wound elements. The apparatus for testing such elements usually includes a network comprising a testing arm in which the element is connected for the purpose of determining its effective inductance and effective resistance. In order to determine these characteristics of the element, it is necessary to determine accurately the current flowing through the element or the voltage across the element, or both, and the present invention is designed to facilitate the determination of these quantities without the necessity of connecting a measuring device in or across the component branch.

A clear understanding of the invention will be had from the following description when considered in connection with the accompanying drawing, wherein Fig. 1 is a diagram of an apparatus embodying the invention and designed to measure the current in the testing arm of the network;

Fig. 2 is a diagram of an apparatus embodying the invention and designed to measure the voltage applied to the testing arm of the network;

Fig. 3 is a diagram of a general scheme for measuring the current in any component branch of any electrical network in accordance with the present invention, and Fig. 4 is a diagram of a general scheme for measuring the voltage applied to any component branch of any electrical network.

Referring now to the drawing, the main network shown in Fig. 1 may be in the form of a bridge circuit which comprises arms 1, 2, 3 and 4, and a detector, such as a telephone receiver 5, electrically connected across the bridge circuit to terminals which connect the arms 1 and 2 and the arms 3 and 4.

In the arm 1 is disposed a fixed resistance 6 which, for purposes of illustration, will be assumed to be of 1000 ohms. A .1 microfarad condenser 7 is connected in the arm 3. The arm 2, which is the testing arm of the bridge circuit, has an adjustable resistance 8 and terminals 9 to which the element 10 to be tested may be electrically connected. Arm 4 includes an adjustable condenser 11 and an adjustable resistance 12, a ground 13 for the bridge circuit being connected electrically at the junction of arms 2 and 4.

A generator 14 supplies alternating current at a constant voltage and frequency to the bridge circuit wherein the arms 1 and 2 are in parallel with the arms 3 and 4; therefore, the law governing the division of the bridge current between the arms 1 and 3 when there is no current flowing in the telephone receiver 5 is that which would govern the division of current between the resistance 6 and the capacitance or condenser 7 if resistance 6 and condenser 7 were connected in parallel by short circuiting telephone receiver 5. Assuming that the element 10 is a soft iron core having a coil winding applied thereto, the fraction of the total current through the bridge which determines the magnetizing force on the core flows through the arm 2 on the resistance side of the bridge circuit. In making the test, the resistances 8 and 12 and the condenser 11 are adjusted until the sides of the bridge which include respectively the arms 1 and 2 and the arms 3 and 4 are balanced, as indicated by the silence in the telephone receiver 5.

In determining the current flow through the element being tested, one of a pair of circuits 15 and 16 is disposed in series with the generator circuit, the circuit 15 including a 400 ohm resistance 17, a 600 ohm resistance 18, and a switch arm 20. A thermocouple 19 has its hot junction 21 positioned in contact with the resistance 18, and includes a milliammeter 22 calibrated to register from zero to 2 milliamperes, and also from zero to 5 milliamperes. The circuit 16 includes the thermocouple resistance 18, together with the switch arm 20, a 400 ohm resistance 23 and a 360 ohm resistance 24. Connected across the circuits 15 and 16 is a shunt circuit 25 which includes a .1 microfarad condenser 26 which, together with either of the circuits 15 or 16, constitutes an auxiliary network equivalent to the upper half of the main network; that is, to the arm 1 with the resistance 6 and the arm 3 with the condenser 7.

In testing the element 10, let it be assumed that the resistances 8 and 12, together with the condenser 11, have been adjusted to cause no current to flow in the telephone receiver 5, and that the switch arm 20 is in the position shown in Fig. 1, completing the circuit 15. The current flow through the arms 2 and 4, respectively, will then be the same as the current flow through the arms 1 and 3, respectively. The parallel circuits 15 and 25 are equivalent to the parallel arms 1 and 3 in the bridge circuit, in that the condenser 26 is equivalent to the condenser 7, and the resistances 17 and 18 are equivalent to the resistance 6; therefore the current flow through the arms 1 and 3 will be the same as that through the arms 2 and 4 including the element 10, and the current passing through the element 10 will be equal to that passing through the resistances 17 and 18 of the circuit 15. The current flowing through the resistance 18 will heat the hot junction 21 of the thermocouple 19, cause a flow of current through the thermocouple circuit which is proportional to the current flow through the resistance 18, and actuate the milliammeter 22, thus measuring the current through the element 10 which is under test. The circuit 15 is used when the current through the thermocouple 19 does not exceed 2 milliamperes, and if it is desired to measure higher values of current, the switch arm 20 is moved to break the circuit 15 and close the circuit 16. In measuring the current through the element 10 when the circuit 16 is closed, the current flow through the condenser 26 will be the same as that through the arm 4, and the current flow through the circuit 16 will be the same as the current flow through the arm 2, which includes the element 10. The current flowing through the circuit 16 will be divided between the resistances 23 and 18, thus allowing a smaller amount of current to flow through the resistance 18 to affect the reading on the milliammeter 21. For the purpose of illustrating the fact that the circuits 15, 16 and 25 are subjected to the same frequency variations as the testing arm 2, let the arm 1 be termed as $r_1$, arm 3 as $C_3$, the resistances in the circuit 15 with the thermocouple unit as $R_{TC}$, and the condenser 26 for the thermocouple unit as $C_{TC}$; the relation between the elements is then expressed by the following equation where $w=2\pi$ times the frequency of the alternating current.

$$\frac{r_1}{R_{TC}} = \frac{\frac{1}{wC_3}}{\frac{1}{wC_{TC}}}$$

Solving:

$$\frac{r_1}{R_{TC}} = \frac{C_{TC}}{C_3}$$

And—

$$C_{TC}R_{TC} = r_1 C_3$$

The same result could be had by using the same characters for arms 1 and 3, as has been used in the aforementioned problem, and using the character $R_{TC}$ for the resistance 18, the remaining problem being to determine whether or not the resistances 17, 18, 23 and 24, as shown in the circuit 16, are equivalent to the resistance 6 in the arm 1. In view of the fact that the current is divided between the resistance 23 and the resistance 18 when flowing through the circuit 16, the effective resistance of the circuit 16 is:

$$\left(400 + \frac{400 \times 600}{400 + 600} + 360\right) \text{ ohms} = (400 + 240 + 360) \text{ ohms} = 1000 \text{ ohms},$$

which is equivalent to the resistance 6 in the arm 1. Therefore, by allowing the current to flow through the circuit 16 instead of the circuit 15, there is $$\frac{4}{10}$$

or $$\frac{2}{5}$$

of the total amount of current passing through the resistance 18 of the thermocouple unit that would pass through this resistance if the circuit 15 were employed instead of the circuit 16, thus permitting a current up to 5 milliamperes to be read on the 5 milliampere scale of the milliammeter 21.

The circuits 15 and 16, which may be termed meter circuits, constitute an electrical network constructed similarly to the main bridge network, whereby the current passing through the element 10 may be measured by a meter disposed outside the main bridge circuit.

In testing the potential across an electrical network, a bridge circuit is employed, having arms 31, 32, 33 and 34, and a detector such as the telephone receiver 35 connected across the circuit at the juncture of the arms 31 and 34 and the arms 32 and 33. A 1000 ohm fixed resistance 36 is disposed in the arm 31 and a 1 microfarad fixed condenser 37 is disposed in the arm 33. The arm 32, which is the testing arm of the bridge circuit, has an adjustable resistance 38 and terminals 39 therein, the terminals being adapted to receive an element 40 which is to be tested.

The arm 34 has disposed therein an adjustable condenser 41 and an adjustable resistance 42, a ground 43 for the bridge circuit being connected electrically at the juncture of arms 32 and 34.

Alternating current from a generator 44 is supplied to the bridge circuit wherein the arms 31 and 32 and also the arms 33 and 34, are in parallel. The law governing the ratio of the potential across the arm 32 to the total potential across the bridge at balance; that is, when the resistances 38 and 42 and the condenser 41 have been adjusted to cause no current to flow in telephone receiver 35 is the same as the law governing the ratio of the potential across the resistance 36 to the total potential across the resistance 36 and the capacitance or condenser 37 in series. It is therefore possible to connect a capacitance of proper value in series with a meter circuit, which is connected across the generator circuit, so that a voltmeter disposed in the meter circuit will read directly the voltage or potential across the arm 32 of the bridge circuit.

The values of the capacitance and resistances in the meter circuit are determined by the same equations used in calculating the values for corresponding capacitance and resistances of the device shown in Fig. 1. The meter circuit consists of a 950 ohm resistance 45, a switch arm 46, a thermocouple resistance 47 of 600 ohms, a .4 microfarad condenser 48, and a 950 ohm resistance 49. A thermocouple 50 has its hot junction positioned in contact with the resistance 47 and is electrically connected to a voltmeter 51 calibrated to read from zero to 5 volts when the meter circuit is used and from zero to 15 volts when the meter circuit is shunted. In shunting the meter circuit, the switch arm 46 is moved away from the contact point 46 and into engagement with the contact 52 and into engagement with the contact point 53, providing a circuit through the resistance 45, a 400 ohm resistance 54, through the switch arm 46, a 300 ohm resistance 55, proportionally dividing the potential through the thermocouple resistance 47 and the resistance 55, and completing the circuit through the condenser 48 and the resistance 49. With this electrical network connected across the generator circuit, which supplies energy to the bridge circuit, the potential across the testing arm 32 of the bridge circuit, which includes the element 40 under test, will be indicated by the voltmeter 51.

The conditions under which each element is tested are the same as the conditions which obtain in service, and the magnetizing force applied to the core of the element under test depends upon the ampere-turns of the winding. Since the number of turns is approximately fixed in any particular specimen, provision is made to control the current through or the potential across the element under test. In the case of low impedance windings, the current through the winding is measured and controlled rather than the voltage across the winding, as the current magnitudes are such as to be more readily measurable than the voltage. In the case of large impedance windings, the reverse condition is true since the voltage is the more readily measurable quantity. Therefore, to facilitate measurement of the current through or voltage across the element under test, two different bridge circuits are employed.

In Figs. 1 and 2 specific types of electrical networks such as the Owen bridge are shown and have been described. Fig. 3 illustrates an arrangement of circuits for measuring the current through an element of any electrical network and consists of an electrical network 60 connected to a source of current such as a generator 61. The element 62 is a component arm of the network 60, the current flowing through which arm is to be measured. Connected in series with the generator 61 and the output circuit thereof is an electrical network which may be termed a meter circuit 63 designed to give the required frequency characteristic for a current indicating device 64. The electrical networks 60 and 63 may consist of any number or combination of self-inductances, mutual inductances, resistances or capacitances for measuring the flow of current through the element 62 by a meter disposed outside of the electrical network 60.

Fig. 4 illustrates an arrangement of electrical networks and circuits for measuring the potential across an element under test and consists of an electrical network 65 having resistances, self inductances, mutual inductances, capacitances, or any combination thereof. The element 66 is a component arm of the network 65, across which arm the potential is to be measured. Electrical energy from a generator 67 is supplied to the electrical network 65. Electrically connected across the generator circuit is an electrical network 68 designed to give the required frequeny characteristic to a potential indicating device such as a voltmeter 69, which will enable the potential or voltage across element 66 to be read from the indication or voltmeter 69.

It will be understood that the resistances, capacitances, and other electrical values specified in the above description are illustrative only, and that the invention may be modified in various ways within the scope of the following claims.

What is claimed is:

1. A method of measuring the flow of current through an electrical element connected in a component arm of a bridge having a resistance and a capacitance, which comprises transmitting an alternating current through the bridge circuit, and another circuit having a resistance and a capacitance, and measuring the current through last mentioned resistance.

2. A method of measuring the flow of current through an electrical element connected in a component arm of a bridge having a resistance and a capacitance, which comprises transmitting an alternating current through the series connection of the bridge circuit, and another circuit having a resistance and capacitance in parallel, and measuring the current through the last mentioned resistance.

3. A method of measuring potential across an electrical element connected in a component arm of a bridge, which comprises applying an alternating potential across the bridge circuit and across a second circuit having a resistance and capacitance in series, and measuring the potential across the resistance.

4. A method of measuring the potential across an electrical element connected in a component arm of a bridge having a resistance and a capacitance, which comprises applying an alternating potential to the bridge circuit and to a second circuit having a resistance and a capacitance, and measuring the potential across the last mentioned resistance.

5. In an apparatus for measuring the flow of current through an electrical circuit, a main electrical circuit, a supply circuit for said main circuit, and an auxiliary electrical circuit the impedance of which is proportional to the impedance of said main circuit at any given frequency connected to said supply circuit for measuring the current through an element of said main circuit.

6. In an apparatus for measuring the flow of current through an electrical circuit, a main electrical circuit, a supply circuit for said main circuit, an auxiliary electrical circuit disposed in series with said supply circuit, said auxiliary circuit comprising resistance and capacitance connected in parallel with each other, and means associated with said auxiliary circuit for measuring the flow of current through said main circuit.

7. In an apparatus for measuring the flow of current through an element or component branch of an electrical network, a supply circuit for said electrical network, an electrical measuring network disposed in series with said supply circuit the impedance of which is proportional to the impedance of said first mentioned network at any given frequency for measuring the flow of current through said element or branch.

8. In an apparatus for testing the electrical characteristics of an element, an electrical network having resistance and capacitance and arranged to include the element, a supply circuit for said electrical network, and a second electrical network the impedance of which is proportional to the impedance of said first mentioned network at any given frequency associated with said supply circuit for indicating the electrical condition imposed upon said element.

9. In an apparatus for measuring potential across an element in a component arm of an impedance bridge circuit, a supply circuit for the bridge circuit, and an electrical network, the impedance of which is proportional to the impedance of said bridge circuit associated with said supply circuit for measuring the potential across said element in said bridge circuit.

10. In an apparatus for testing the electrical characteristics of an element, an electrical network having resistance and capacitance and arranged to include the element, a supply circuit for said electrical network, and a second electrical network, the impedance of which is proportional to the impedance of said first mentioned network at any given frequency disposed in parallel with said supply circuit for indicating the potential across said first electrical network.

11. In an apparatus for measuring the flow of current through an element connected in a branch of an electrical network, a main electrical network in one branch of which the element through which the current to be measured is connected, a supply circuit for said main circuit, an auxiliary network connected in series with the supply circuit and the main electrical network, a current measuring device in said auxiliary network, said auxiliary network having its impedances proportional to and arranged in the same manner as the corresponding impedances in the main circuit so that the current through the branch of the auxiliary network in which the current measuring device is connected is proportional to the current which is to be measured in the element in the branch of the main circuit at all frequencies or intensities of current.

12. In an apparatus for measuring the flow of current through an element connected in a branch of an electrical network, a main electrical network in one branch of which the element through which the current to be measured is connected, a supply circuit for said main circuit, an auxiliary network connected in series with the supply circuit and the main electrical network, a current measuring device in said auxiliary network, said auxiliary network having its impedances arranged to be electrically equivalent to a circuit having its impedances proportional to and arranged in the same manner as corresponding impedances in the main circuit, said equivalent circuit arrangements being in accordance with any of the several well known theorems of equivalent circuits, so that the current through the branch of the auxiliary network in which the current measuring device is connected is proportional to the current which is to be measured in the element in the branch of the main circuit at all frequencies or intensities of current.

13. In an apparatus for measuring the voltage across an element connected in a branch of an electrical network, a main electrical network in one branch of which the element across which the voltage to be measured is connected, a supply circuit for said main circuit, an auxiliary network connected in shunt with the main electrical network, a voltage measuring device in said auxiliary network, said auxiliary network having its impedances proportional to and arranged in the same manner as the corresponding impedances in the main circuit so that the voltage across the branch of the auxiliary network in which the voltage measuring device is connected is proportional to the voltage which is to be measured across the element in the branch of the main circuit at all frequencies or intensities of voltage.

14. In an apparatus for measuring the voltage across an element connected in a branch of an electrical network, a main electrical network in one branch of which the element across which the voltage to be measured is connected, a supply circuit for said main circuit, an auxiliary network connected in shunt with the main electrical network, a voltage measuring device in said auxiliary network, said auxiliary network having its impedances arranged to be electrically equivalent to a circuit having its impedances proportional to and arranged in the same manner as corresponding impedances in the main circuit, said equivalent circuit arrangements being in accordance with any of the several well known theorems of equivalent circuits, so that the voltage across the branch of the auxiliary network in which the voltage measuring device is connected is proportional to the voltage which is to be measured across the element in the branch of the main circuit at all frequencies or intensities of voltage.

In witness whereof, I hereunto subscribe my name this 26th day of February, 1931.

LOUIS B. BUTTERFIELD.